(12) United States Patent
Agrawal et al.

(10) Patent No.: US 12,556,567 B2
(45) Date of Patent: Feb. 17, 2026

(54) VIRTUAL REALITY AND DIGITAL TWIN-BASED SECURITY TESTCASE EXECUTION

(71) Applicant: International Business Machines Corporation, Armonk, NY (US)

(72) Inventors: Tushar Agrawal, West Fargo, ND (US); Christian Compton, Austin, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 17/875,287

(22) Filed: Jul. 27, 2022

(65) Prior Publication Data
US 2024/0039945 A1    Feb. 1, 2024

(51) Int. Cl.
*H04L 29/00*     (2006.01)
*H04L 9/40*     (2022.01)

(52) U.S. Cl.
CPC ........ *H04L 63/1433* (2013.01); *H04L 63/101* (2013.01); *H04L 63/107* (2013.01)

(58) Field of Classification Search
CPC .. H04L 63/1433; H04L 63/101; H04L 63/107
See application file for complete search history.

(56) References Cited

U.S. PATENT DOCUMENTS

| | | | |
|---|---|---|---|
| 8,839,455 B1 | 9/2014 | Tormasov | |
| 9,671,777 B1* | 6/2017 | Aichele | B25J 9/1666 |
| 9,811,668 B2 | 11/2017 | Sabetta et al. | |
| 2019/0251267 A1 | 8/2019 | Wysopal et al. | |
| 2019/0303759 A1* | 10/2019 | Farabet | G06N 3/045 |
| 2021/0110075 A1 | 4/2021 | Dalloro et al. | |
| 2022/0014946 A1 | 1/2022 | Merwaday et al. | |
| 2022/0036302 A1* | 2/2022 | Cella | H04L 67/1097 |
| 2022/0100182 A1* | 3/2022 | Mehrotra | G05B 19/41885 |
| 2022/0100851 A1* | 3/2022 | Mehrotra | G06F 8/65 |
| 2022/0108262 A1* | 4/2022 | Cella | G05B 17/02 |
| 2022/0187847 A1* | 6/2022 | Cella | G06Q 10/0833 |
| 2022/0197306 A1* | 6/2022 | Cella | B25J 9/1653 |

(Continued)

FOREIGN PATENT DOCUMENTS

CN     113939822 A     1/2022

OTHER PUBLICATIONS

Dietz et al., "Integrating Digital Twin Security Simulations in the Security Operations Center," Proceedings of the 15th International Conference on Availability, Reliability and Security, 2020, 9 pages.

(Continued)

*Primary Examiner* — Don G Zhao
(74) *Attorney, Agent, or Firm* — Zilka-Kotab, P.C.

(57) ABSTRACT

A computer-implemented method, in accordance with one embodiment, includes generating, using data defining physical characteristics and security characteristics of a physical environment, a digital twin of the physical environment. A set of test conditions are simulated within the digital twin of the physical environment to test the security characteristics. The simulation of the set of test conditions are analyzed for evaluating the security characteristics. A result of the evaluation is output.

18 Claims, 4 Drawing Sheets

(56) References Cited

U.S. PATENT DOCUMENTS

| | | | | |
|---|---|---|---|---|
| 2023/0004801 | A1* | 1/2023 | Farabet | G05D 1/00 |
| 2023/0078832 | A1* | 3/2023 | Wiegman | G06N 20/00 |
| | | | | 703/8 |
| 2023/0084918 | A1* | 3/2023 | Wiegman | G08G 5/55 |
| | | | | 701/3 |
| 2023/0328104 | A1* | 10/2023 | Ghosh | H04W 4/021 |
| | | | | 726/23 |
| 2023/0421615 | A1* | 12/2023 | Visoky | G06F 8/65 |
| 2024/0031388 | A1* | 1/2024 | Ellath Meethal | H04L 67/12 |
| 2024/0147265 | A1* | 5/2024 | Vaishnavi | H04L 41/5041 |
| 2024/0329966 | A1* | 10/2024 | Vaishnavi | G06F 9/44505 |
| 2024/0419577 | A1* | 12/2024 | Vaishnavi | G06F 8/65 |
| 2025/0252669 | A1* | 8/2025 | Yuksel | G01S 17/89 |

OTHER PUBLICATIONS

Eckhart et al., "Digital Twins for Cyber-Physical Systems Security: State of the Art and Outlook," Security and Quality in Cyber-Physical Systems engineering, 2019, 32 pages, retrieved from https://www.semanticscholar.org/paper/Digital-Twins-for-Cyber-Physical-Systems-Security%3A-Eckhart-Ekelhart/76f4a43315351411facc3a3b3bc6bc752a18b06b.

Vielberth et al. "A Digital Twin-Based Cyber Range for SOC Analysts," IFIP International Federation for Information Processing, 2021, pp. 293-311.

Patel et al., "Real-time, Simulation-based Identification of Cyber-Security Attacks of Industrial Plants," IEEE, 2021, 6 pages.

Zhao et al., "A Digital Twin Framework for Cyber Security in Cyber Physical Systems," arXiv, 2022, 8 pages, retrieved from https://arxiv.org/abs/2204.13859.

Wikipedia, "Digital Twin," Wikipedia, 2022, 10 pages, retrieved from https://en.wikipedia.org/wiki/Digital_twin.

Grand View Research, "Cyber Security Market Size, Share & Trends Analysis Report by Component, by Security Type, by Solution, by Services, by Deployment, by Organization Size, by Applications, by Region, and Segment Forecasts, 2022-2030," Grand View Research, 2022, 8 pages, retrieved from https://www.grandviewresearch.com/industry-analysis/cyber-security-market.

IBM, "IBM Wazi Developer for Red Hat CodeReady Workspaces," IBM, 2022, 5 pages, retrieved from https://www.ibm.com/products/wazi-developer on Jul. 18, 2022.

IBM, "IBM Digital Twin Exchange," IBM, 2022, 8 pages, retrieved from https://www.ibm.com/products/digital-twin-exchange on Jul. 18, 2022.

IBM, "AI Vision," IBM Research, 2022, 10 pages, retrieved from https://research.ibm.com/haifa/dept/imt/cv/index.html#info on Jul. 18, 2022.

Nenkova et al. "Introducing the Enhanced User Experience Patterns in IBM Cloud," IBM, Mar. 17, 2020, 6 pages, retrieved from https://www.ibm.com/cloud/blog/announcements/enhanced-user-experience-patterns-in-ibm-cloud.

Moore et al., "Conversational UX Design," IBM Research, 2019, 5 pages, retrieved from https://researcher.watson.ibm.com/researcher/view_group.php?id=8426.

* cited by examiner

VIRTUAL REALITY AND DIGITAL TWIN-BASED SECURITY TESTCASE EXECUTION

BACKGROUND

The present invention relates to executing security testcases to identify security weaknesses, and more specifically, this invention relates to executing such security testcases using a digital twin of an environment and virtual reality.

Physical security for any environment has two major components: access control and surveillance.

Regarding access control, obstacles are typically placed in the way of potential attackers and physical sites should be hardened against accidents, attacks, or environmental disasters. Such hardening measures include fencing, physical access control points (e.g., locks, access control cards, biometric access control systems), and fire suppression systems.

Regarding surveillance, physical locations are typically monitored using surveillance cameras and notification systems, such as closed circuit television (CCTV), intrusion detection sensors, heat sensors, and smoke detectors.

There are often gaps in any physical security environment, such as improper position of the cameras or sensors, insufficient capacity of the devices, etc. These gaps in security can be exploited if not discovered and corrected.

Moreover, a physical security environment may be sufficient for normal situations, but would likely fail if presented with an extraordinary event, such as an extreme weather event, presence of more people than the security system can handle, etc.

There is currently no automated technique for evaluation to understand where security is lacking and needs enhancement, or which contextual situation cannot be addressed by the existing physical security environment.

SUMMARY

A computer-implemented method, in accordance with one embodiment, includes generating, using data defining physical characteristics and security characteristics of a physical environment, a digital twin of the physical environment. A set of test conditions are simulated within the digital twin of the physical environment to test the security characteristics. The simulation of the set of test conditions are analyzed for evaluating the security characteristics. A result of the evaluation is output.

A computer program product for evaluating security characteristics using a digital twin, in accordance with one embodiment, includes one or more computer readable storage media, and program instructions collectively stored on the one or more computer readable storage media. The program instructions include program instructions to generate, using data defining physical characteristics and security characteristics of a physical environment, a digital twin of the physical environment; program instructions to simulate a set of test conditions within the digital twin of the physical environment to test the security characteristics; program instructions to analyze the simulation of the set of test conditions for evaluating the security characteristics; and program instructions to outputting a result of the evaluation.

A system, according to one embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
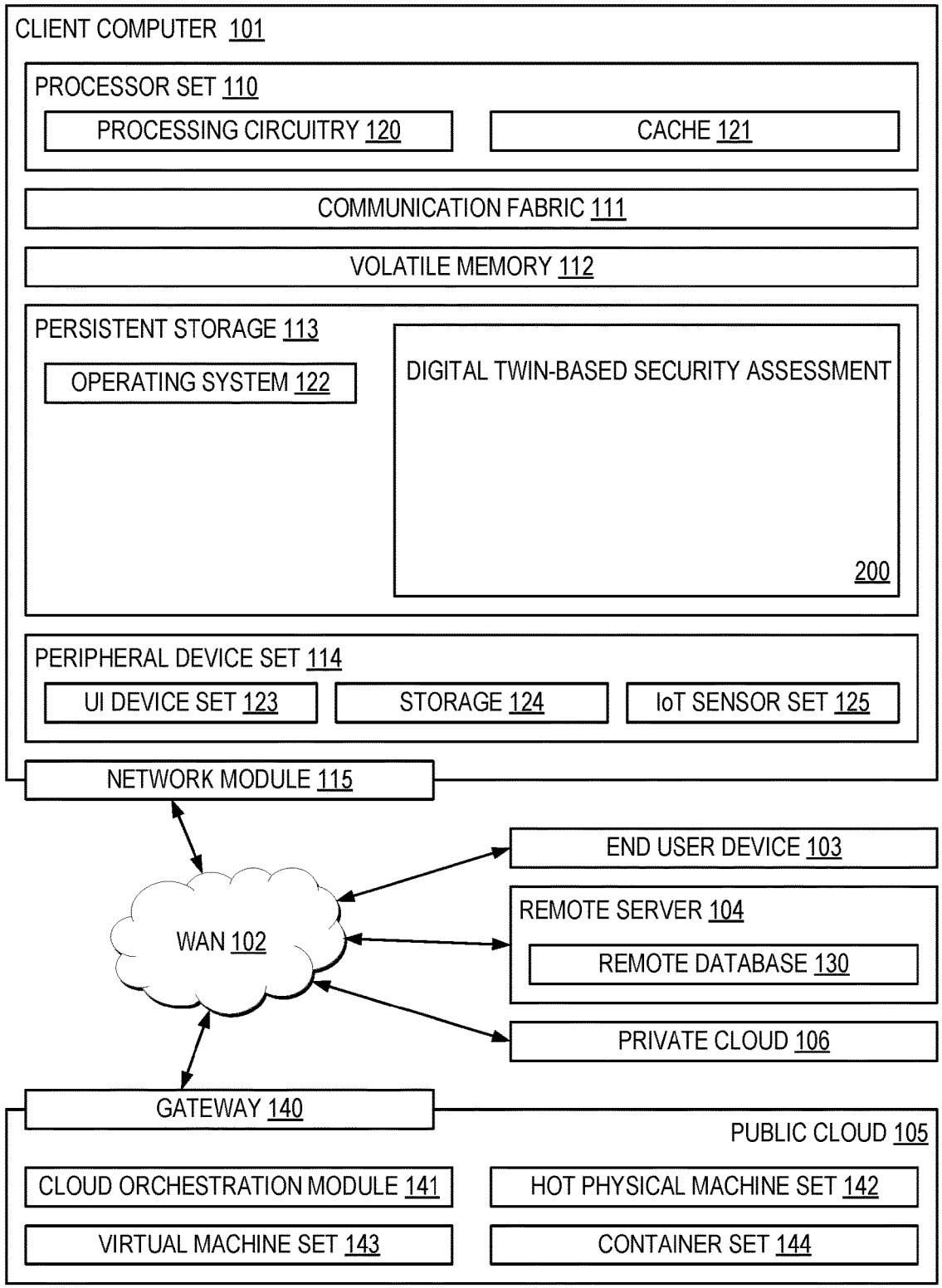
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for execution of test cases using virtual reality and digital twin to evaluate how secure a particular physical environment is, and which scenarios cause failures in physical security, so that appropriate correction can be applied in a proactive manner.

In one general embodiment, a computer-implemented method includes generating, using data defining physical characteristics and security characteristics of a physical environment, a digital twin of the physical environment. A set of test conditions are simulated within the digital twin of the physical environment to test the security characteristics. The simulation of the set of test conditions are analyzed for evaluating the security characteristics. A result of the evaluation is output.

In another general embodiment, a computer program product for evaluating security characteristics using a digital twin includes one or more computer readable storage media, and program instructions collectively stored on the one or more computer readable storage media. The program instructions include program instructions to generate, using data defining physical characteristics and security characteristics of a physical environment, a digital twin of the physical environment; program instructions to simulate a set of test conditions within the digital twin of the physical environment to test the security characteristics; program instructions to analyze the simulation of the set of test conditions for evaluating the security characteristics; and program instructions to outputting a result of the evaluation.

In yet another general embodiment, a system includes a processor and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as digital twin-based security assessment code block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As noted above, there can be various gaps in any physical security environment, such as improper position of the cameras or sensors, insufficient capacity of the devices, etc. These gaps in security can be exploited if not discovered and corrected. Ideally, periodic evaluation would be performed to understand where security is likely to fail and thus needs enhancement, or which contextual situation cannot be addressed by the current security configuration.

Presented herein is a methodology that enables execution of various test cases to evaluate how secure a given physical environment is, and which scenario may cause failure in physical security, so that appropriate correction can be applied in a proactive manner. The approaches described herein us a digital twin of the physical environment, ideally in conjunction with virtual reality, to simulate test conditions to test the security characteristics of a security configuration, as simulated in the digital twin.

Figure 2:
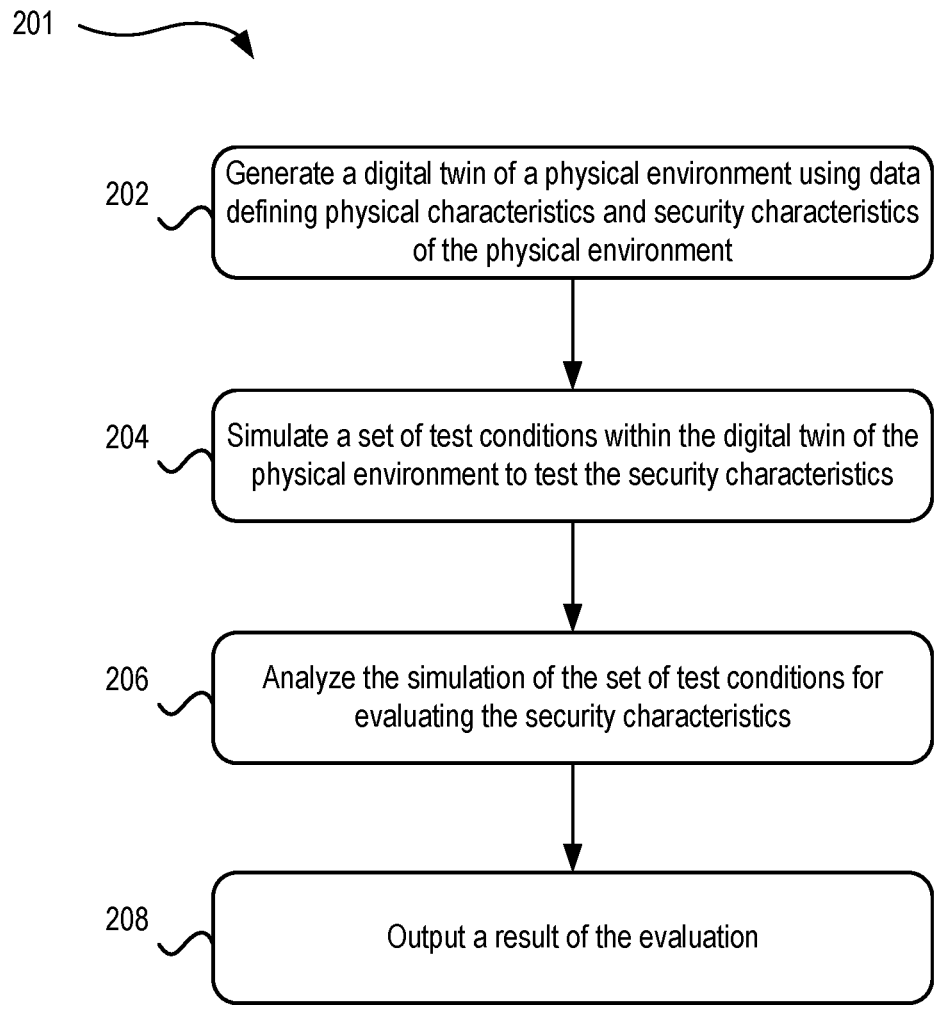
FIG. 2 is a flowchart of a method, in accordance with one embodiment of the present invention.

Now referring to FIG. 2, a flowchart of a method 201 is shown according to one embodiment. The method 201 may be performed in accordance with the present invention in any of the environments depicted in FIG. 1, among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a computer, set of computers, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2, method 201 may initiate with operation 202, where a digital twin of a physical environment is generated using data defining physical characteristics and security characteristics of the physical environment.

The data defining the physical characteristics of the physical environment preferably generally corresponds to the physical objects, boundaries, etc. in the physical environment.

The data defining the security characteristics of the physical environment preferably generally corresponds to the types of security equipment in the physical environment, physical locations of the security equipment, functionality of the security equipment, security protocols, etc. In some approaches, the security characteristics of the physical environment in the digital twin include simulated access control systems (e.g., barriers, doors, gates), simulated security agents (e.g., simulated security guards), and simulated sensors (e.g., CCTV cameras). The security protocols may be protocols used in particular locations within a physical space of the physical environment, protocols used throughout the physical space, etc.

Such data may also include security equipment and/or protocols not currently in the physical environment, e.g., such as where an evaluation of the effect of a prospectively placed sensor, camera, etc. is desired.

In operation 204, a set of test conditions within the digital twin of the physical environment is simulated to test the security characteristics. For example, the set of test conditions may include a set of simulated agents (e.g., simulated people) that attempt to breach the security characteristics of the digital twin. The simulated agents may be trained to attempt to breach the security characteristics using any known technique, such as reinforcement learning, Markov-based decision making, etc. In some approaches, the set of test conditions includes simulated vehicles. In further approaches, the set of test conditions includes weather conditions.

In operation 206, the simulation of the set of test conditions is analyzed for evaluating the security characteristics.

In operation 208, a result of the evaluation is output. In one approach, the result of the evaluation includes a recommendation for security modifications to make to the security characteristics of the physical environment. In another approach, the result of the evaluation includes an identification of which test conditions or equivalently which set of test conditions cause a failure of at least one of the security conditions.

In some embodiments, the method 201 may further include modifying the security characteristics of the digital twin of the physical environment based on the analysis of the simulation of test conditions, and performing the method 201 with the modified security characteristics in the digital twin of the physical environment. The effectiveness of the modified security characteristics relative to the security characteristics existing in the physical environment can then be evaluated.

Figure 3:
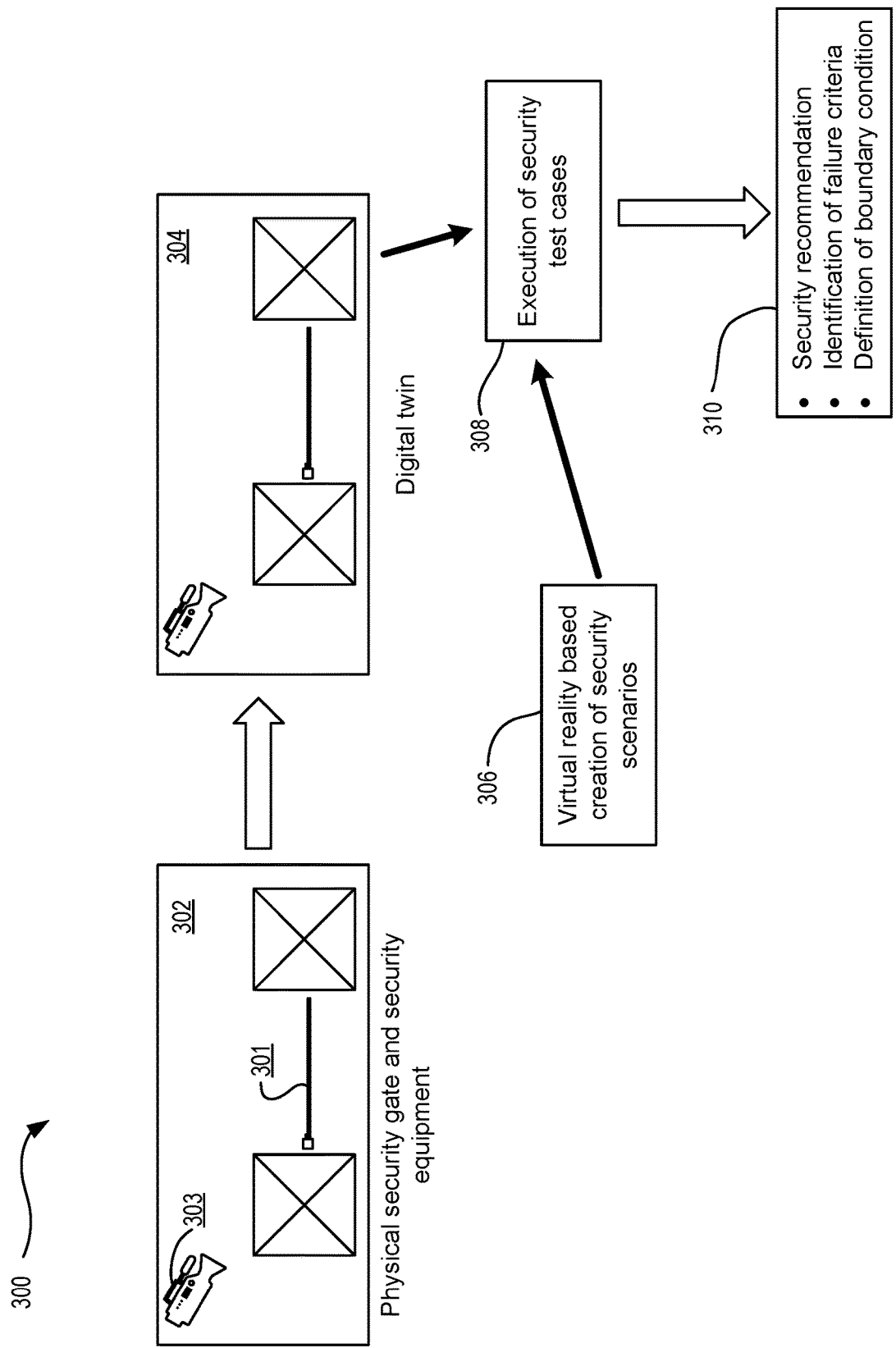
FIG. 3 is a context diagram, in accordance with one embodiment of the present invention.

Now referring to FIG. 3, a context diagram 300 is shown according to one embodiment. The methodology corresponding to the context diagram 300 may be performed in accordance with the present invention in any of the environments depicted in FIGS. 1-2, among others, in various embodiments.

Various steps of the methodology corresponding to the context diagram 300 may be performed by any suitable component of the operating environment. For example, in various embodiments, the methodology may be partially or entirely performed by a computer, set of computers, or some other device having one or more processors therein. The processor, e.g., processing circuit(s), chip(s), and/or module(s) implemented in hardware and/or software, and preferably having at least one hardware component may be utilized in any device to perform one or more steps of the methodology. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, a physical environment 302 having a physical security gate 301 and security equipment (e.g., camera 303) is depicted. A digital twin 304 of the physical environment 302 is created. Execution of one or more test cases is performed using the digital twin 304 and virtual reality 306 based creation of various types of security scenarios. See test case execution module 308. A result 310 of running the test cases is output. In this example, the result 310 includes a security recommendation, identification of failure criteria, and a definition of a boundary condition.

Figure 4:
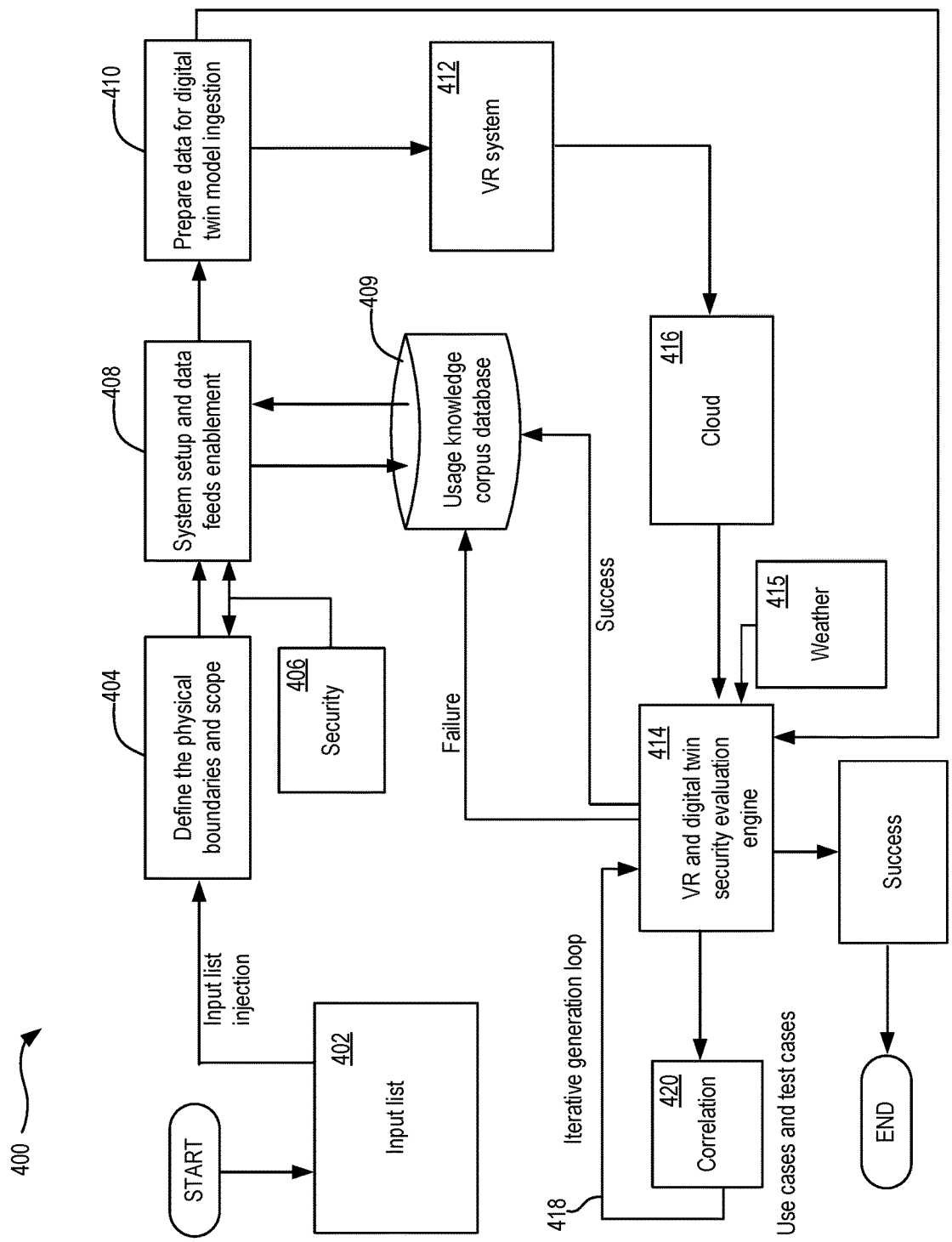
FIG. 4 is a process flowchart of an illustrative method, in accordance with one embodiment of the present invention.

Now referring to FIG. 4, a process flowchart of an illustrative method 400 is shown according to one embodiment. The method 400 may be performed in accordance with the present invention in any of the environments depicted in FIGS. 1-3, among others, in various embodiments. Of course, more or fewer operations, inputs, objects, specifications, etc. than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, set of computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art. Moreover, unless otherwise specified, the various operations and sub-processes may utilize known techniques that would become apparent to one skilled in the art upon reading the present disclosure.

As shown in FIG. 4, method 400 may initiate with operation 402, in which an input list of characteristics of a physical environment to be evaluated is generated, received, or generated in part and received in part. The characteristics of a physical environment may include physical characteristics of the physical environment, specification of security parameters, etc. For example, illustrative security characteristics may include such things as:

physical space limitations (e.g., walls, boundaries, etc.)

access control (e.g., barriers, physical gates, locks, etc.; how gates and locks are opened, etc. and who is authorized to open them, etc.)

surveillance (e.g., cameras, sensors, alarms, etc.; area protected by each surveillance object (e.g., camera range, sensor range, etc.))

functional requirements (e.g., specification of strength of security required, limitations on access through areas or access control devices, etc.)

non-functional requirements (e.g., response time, throughput, utilization, static volumetric, scalability, capacity, availability, reliability, recoverability, maintainability, serviceability)

test result(s) of previous use case(s) (e.g., result of a previous analysis generated by the methodology of FIGS. 2-4)

real life results (e.g., examples of previous security breaches in the physical environment)

In operation 404, the physical boundaries of the physical environment are defined based at least in part on the input list from operation 402. Operation 404 may include user specification of particular characteristics, e.g., objects, distances, security objectives, etc., of the physical environment that define the boundaries of the evaluation as well as the scope of the evaluation.

Operation 404 may also include receiving more details about security devices and/or protocols, such as camera specifications and functionality, camera movement capability, camera range and field of view, sensor specifications and functionality, sensor range and field of view, etc.; details about networked capabilities of the various security devices, such as control of the camera, feed of the camera, functioning of the access control system, etc. Such details may be received, at least in part, from the security system 406 itself, a database having at least some of the details, user input, etc.

In operation 408, the physical security system setup is assessed for reproduction in the digital twin. The data feeds from the security devices of the security system 406 may also be assessed. These assessments may take into consideration the details mentioned above in relation to operation 404. The output of operation 408 may include data that provides characteristics of the security system usable in generating the digital twin. Such data may include positions of the security devices in the physical environment, which areas in the physical environment the security devices protect, how they protect the physical environment (e.g., by detecting motion, but capturing images, by keeping a barrier locked until an authorized code or card swipe is detected, etc.). Such data may also include characteristics of the data feeds from the security devices so that the data feeds can be simulated during testing in the digital twin.

Operation 408 may also include generating data about a location of a physical security guard, patrol route of the security guard, scheduling of patrols, etc.

Operation 408 may add the data generated thereby to a usage knowledge corpus database 409. In this way, the information about the physical environment may be reused to regenerate the digital twin in a future test without having to perform the preprocessing of operations 402 and 404.

Moreover, in subsequent iterations of method 400, operation 408 may receive information from the usage knowledge corpus database 409, perhaps with addition of a virtual security device added to the database 409 in an attempt to overcome a security failure observed in a prior iteration of the method 400. For example, if a security failure is detected in a prior iteration of method 400, a motion sensor may be added virtually to the data in the database 409. The virtual motion sensor may then be considered in operation 408 so that the motion sensor appears in the next version of the digital twin, and its effect on the overall security scheme can be evaluated.

In operation 410, data from operation 408, and potentially from operations 402 and 404, is prepared for digital twin modelling, and the digital twin is generated. Known techniques for generating the digital twin may be used. In a preferred embodiment, operation 410 generates a digital twin model of the physical environment that includes characteristics of the physical security devices such as camera focus ranges, camera field of view, type of camera (e.g., visual, thermal, infrared), physical gate conditions, access control system characteristics, etc.

A VR system 412 of known type is configured to execute security test cases on the digital twin, whereby the VR system creates different types of test cases and the same will be evaluated by the VR and digital twin security evaluation engine 414. The initial VR configuration may be selected based on a desired use case, which itself can be analyzed for security weaknesses. The use case can then be varied according to test cases to determine the effects of the variables on the security system.

The VR system 412 may receive various inputs about the security objectives, such as providing access to authorized people, providing vehicle access, keeping unauthorized people out of a secure area, etc. The VR system may also identify the management of various vehicles, people in the environment, and may also simulate a varying number of agents (simulated persons), a rate of people movement, vehicle movement, etc.

The VR system 412 may identify a physical boundary where the security is to be evaluated and create various contextual situations, such as different weather conditions, event related context, traffic patterns, etc. Moreover, based on the given parameters, any specific guideline, such as keeping social distancing, may be identified and the same can be considered during VR simulation.

The VR system 412 creates various combinations of test cases in the physical environment. The combination of VR content can be created by combination of different parameters of any type. A few exemplary parameters include:

Number of people in the simulation—(from 1 to n)
Number of vehicles in the simulation—(from 0 to m)
Relative positions of people and/or vehicle(s) in the environment (for 1 to n or 0 to m number of vehicles, etc.)
Movement of people and/or vehicle(s) in the environment (for 1 to n or 0 to m number of vehicles, etc.)
Different weather conditions from a weather conditions source 415, etc.
Various cyclical calendar based anomalies
Time of day, e.g., day or night
Agents (e.g., simulated people) that attempt to breach the security characteristics
Historical information such as that corresponding to a previous security breach at this location or at another location with a similar security setup
Etc.

Some or all of these parameters may be received as a result of operation 410, e.g., the parameters of a simulation in the digital twin may be provided to the VR system 412. Thus, in some embodiments, simulations and/or parameters may be supplied to the VR system to create an environment based on the simulation created. Using this simulated environment, a determination can be made as to whether any pre-defined security norms are violated within the environment, as described in more detail below. For each use case where the security compliance/norms were violated, an action that should be taken in order to address the security concern may be determined and output. Alternatively, a user may determine an action that should be taken. The assessment can be re-run with the result of the action included therein.

In some approaches, the test cases may be pre-scripted. In other approaches, the test cases are created by changing one or more of the aforementioned parameters of a use case. In yet other approaches, a test case may have a random component, e.g., the number of users and a weather condition are randomly selected.

A simulated agent that attempts to breach the security characteristics may be trained to attempt to breach the security characteristics using any known technique. Preferably, the agent is trained using a machine learning technique, such as reinforcement learning, Markov-based decision making, etc. Reinforcement learning is particularly preferred. A reinforcement learning agent is able to perceive and interpret its environment, take actions, and learn through trial and error. Thus, the agent's attempts to circumvent security improves with each iteration. By running several sequential test cases where the agent continues to improve its attempts to breach security (as a real human might do), a more accurate assessment of the security system is generated. Known machine learning techniques may be used, along with input that would become apparent to one skilled in the art upon reading the present disclosure.

The VR system may create many different VR environments with various combinations of above parameters. For example, by using simulated people, the VR system can create nC0+nC1+nC2+ . . . +nCn combinations of parameters. By varying and/or combining various parameters, the VR system can create multiple scenarios which are related to the security.

The VR and digital twin security evaluation engine 414 accepts the VR infused variables. The VR and digital twin security evaluation engine 414 receives the VR based simulated contextual situations and executes the same in the digital twin security environment.

The VR and digital twin security evaluation engine 414 also receives the digital twin. The VR infused variables and the digital twin may be received from storage, from a network, from the cloud 416, etc.

Computational renderings are generated within the VR and digital twin security evaluation engine 414, potentially using an iterative generation loop 418 and a correlation module 420. Based on the digital twin simulation, various characteristics of the security system can be estimated, such as what will be the capacity of the physical environment to address security. Moreover, a contextual scenario where the security fails can be determined.

If a security scenario fails, a notification can be output, and in some approaches, a recommendation of how the security devices or protocols are to be arranged and/or changed to ensure required security. For example, a recommendation may be to add a camera to view a particular location. Another recommendation may refer to capacity management, e.g., such as to limit an area such as a lobby to a certain number of people.

Iterative changes and/or updates to the model can be incorporated into subsequent renderings and the process re-run with the changes and/or updates to determine whether they eliminate risk elements.

Information about successes and failures can be stored in the usage knowledge corpus database 409.

In one aspect, the usage knowledge corpus database 409 or another database may be updated using organizational crowdsourced shared usage patterns. Particularly, this aspect offers the ability for organizations to have the ability to share (e.g., with permission and through anonymized data scrubbing) their models with other organizations that have similar type requirements and/or data elements for input(s). This allows for the inventive system to make proactive recommendations based on the ability to generate and convey both positive and negative outcomes of feedback loops for previously used digital twin models through iterative temporal usage histories. Through the anonymized data, the models would be able to scrum certain data that was unique to the using organization.

There has thus been described a computing system and methodology that can create different types of security test cases and can execute the same to evaluate physical security in a given physical environment.

The VR and digital twin computing system may create various combinations of test cases and different security context to identify which scenario cannot be handled by the current physical security setup.

Proactive recommendations based on use case observation(s) can be made. To evaluate the physical security in any environment, one or more contextual situation can be provided (such as a sports event in a city or in a stadium, number of spectators that are in attendance, etc.), and accordingly VR and digital twin computing system can simulate the contextual situation in terms of the security and recommend what changes are to be applied in the environment.

The inventive system and methodology enable variable population infusion. Based on any security need, the proposed system may be configured to recommend how the security configuration is to be applied in any physical environment, such as positioning of various security equipment, number of moving people in the environment, etc.

The inventive system and methodology allow capacity planning and management thereof. The VR and digital twin based physical security evaluation engine can execute various security test cases and accordingly identify the capacity of the environment (e.g., the environment can handle security scanning of 100 people per hour, and can track the mobility pattern of 100 people) so that appropriate action can be taken.

Based on simulated test cases, the proposed system and methodology can identify the physical boundary in the surrounding area/ecosystem that is within the range of security coverage.

In one example of a use case, assume the Rio Grande Amusement Park has many different rides and activities across the amusement park. Some areas of the park are open at different times, and some are only accessible by premium members. Further, there are frequently longer lines for its most popular attractions.

Assessing their current security system with the system and methodology presented herein allows the running of different simulations in VR which then map to a digital twin environment. For example, assume the system simulates a busy day with thunderstorms, which shut down the attractions. While most people seek shelter because of the rain, as determined by the digital twin model, it is evident that the food courts are quickly overwhelmed with people. The VR and digital twin based physical security evaluation engine reruns this simulation with different security settings, including opening other parts of the park to help spread out more people before the storms pass through, as well as reducing the number of premium access areas during the storm season and other access points. The recommendations for this situation are output, and are adopted by the park as part of its severe weather protocol.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by a computer, using data defining physical characteristics and security characteristics of a physical environment, a digital twin of the physical environment;
   simulating, by the computer, a set of test conditions within the digital twin of the physical environment to test the security characteristics;
   analyzing, by the computer, the simulation of the set of test conditions for evaluating the security characteristics; and
   outputting, by the computer, a result of the evaluating,
   wherein the set of test conditions includes a set of simulated agents that attempt to breach the security characteristics, wherein the simulated agents in the set of simulated agents are trained to attempt to breach the security characteristics using reinforcement learning.

2. The computer-implemented method of claim 1, wherein the security characteristics of the physical environment include types of security equipment, physical locations of the security equipment, and functionality of the security equipment.

3. The computer-implemented method of claim 1, wherein the security characteristics of the physical environment in the digital twin include simulated access control systems, simulated security agents, and simulated sensors.

4. The computer-implemented method of claim 1, wherein the data defining the security characteristics of the physical environment include data defining security protocols used in particular locations within a physical space of the physical environment.

5. The computer-implemented method of claim 1, wherein the set of test conditions includes simulated vehicles.

6. The computer-implemented method of claim 1, wherein the set of test conditions includes weather conditions.

7. The computer-implemented method of claim 1, wherein the result of the evaluating includes a recommendation for security modifications to make to the security characteristics of the physical environment.

8. The computer-implemented method of claim 1, wherein the result of the evaluating includes an identification of which test conditions cause a failure of at least one of the security characteristics.

9. The computer-implemented method of claim 1, comprising modifying the security characteristics of the digital twin of the physical environment based on the analysis of the simulation of the set of test conditions, and performing the method with the modified security characteristics in the digital twin of the physical environment.

10. The computer-implemented method of claim 1, further comprising storing information about successes and failures in a corpus database in hardware memory.

11. The computer-implemented method of claim 1, wherein the result of the evaluating that is output by the computer includes a security recommendation and identification of failure criteria.

12. A computer program product for evaluating security characteristics using a digital twin, the computer program product comprising:
one or more computer readable storage media, and program instructions collectively stored on the one or more computer readable storage media, the program instructions comprising:
program instructions to generate, using data defining physical characteristics and security characteristics of a physical environment, a digital twin of the physical environment;
program instructions to simulate a set of test conditions within the digital twin of the physical environment to test the security characteristics;
program instructions to analyze the simulation of the set of test conditions for evaluating the security characteristics; and
program instructions to outputting a result of the evaluating,
wherein the set of test conditions includes a set of simulated agents that attempt to breach the security characteristics,
wherein the simulated agents in the set of simulated agents are trained to attempt to breach the security characteristics using reinforcement learning.

13. The computer program product of claim 12, wherein the security characteristics of the physical environment in the digital twin include simulated access control systems, simulated security agents, and simulated sensors.

14. The computer program product of claim 12, wherein the data defining the security characteristics of the physical environment include data defining security protocols used in particular locations within a physical space of the physical environment.

15. The computer program product of claim 12, wherein the set of test conditions includes simulated vehicles and weather conditions.

16. The computer program product of claim 12, wherein the result of the evaluating includes an identification of which test conditions cause a failure of at least one of the security characteristics and a recommendation for security modifications to make to the security characteristics of the physical environment.

17. The computer program product of claim 12, comprising modifying the security characteristics of the digital twin of the physical environment based on the analysis of the simulation of the set of test conditions, and re-executing the program instructions with the modified security characteristics in the digital twin of the physical environment.

18. A system, comprising:
a hardware processor; and
logic integrated with the hardware processor, executable by the hardware processor, or integrated with and executable by the hardware processor, the logic being configured to:
generate, by the hardware processor using data defining physical characteristics and security characteristics of a physical environment, a digital twin of the physical environment;
simulate, by the hardware processor, a set of test conditions within the digital twin of the physical environment to test the security characteristics; and
analyze, by the hardware processor, the simulation of the set of test conditions for evaluating the security characteristics; and
output, by the hardware processor, a result of the evaluating,
wherein the set of test conditions includes a set of simulated agents that attempt to breach the security characteristics,
wherein the simulated agents in the set of simulated agents are trained to attempt to breach the security characteristics using reinforcement learning.

\* \* \* \* \*